US010403229B2

(12) United States Patent
Tsukada

(10) Patent No.: US 10,403,229 B2
(45) Date of Patent: Sep. 3, 2019

(54) SYSTEM AND METHOD FOR REPRODUCING COLOR IMAGE WITH SUPPOSED REPRODUCED COLOR GAMUTS

(71) Applicant: Masato Tsukada, Tokyo (JP)

(72) Inventor: Masato Tsukada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/383,423

(22) PCT Filed: Mar. 6, 2013

(86) PCT No.: PCT/JP2013/056175
§ 371 (c)(1),
(2) Date: Sep. 5, 2014

(87) PCT Pub. No.: WO2013/133335
PCT Pub. Date: Sep. 12, 2013

(65) Prior Publication Data
US 2015/0077431 A1 Mar. 19, 2015

(30) Foreign Application Priority Data
Mar. 8, 2012 (JP) ................... 2012-052107

(51) Int. Cl.
G09G 5/02 (2006.01)
G09G 5/06 (2006.01)
H04N 1/60 (2006.01)

(52) U.S. Cl.
CPC ............ G09G 5/02 (2013.01); G09G 5/06 (2013.01); H04N 1/6058 (2013.01);
(Continued)

(58) Field of Classification Search
CPC ............ G06T 11/001; H04N 1/6088; H04N 5/23287; H04N 1/6025; H04N 1/603;
(Continued)

(56) References Cited

U.S. PATENT DOCUMENTS 6,560,358 B1 * 5/2003 Tsukada ................. H04N 1/603
358/1.9
6,724,507 B1 * 4/2004 Ikegami ............... H04N 1/6058
358/501

(Continued)

FOREIGN PATENT DOCUMENTS

EP 0 993 180 A1 4/2000
JP 2000-113174 A 4/2000

(Continued)

OTHER PUBLICATIONS

Nicholas Hellmuth, Color Management & ICC Colr Profiles, May 2009.*

(Continued)

Primary Examiner — Devona E Faulk
Assistant Examiner — Ming Wu
(74) Attorney, Agent, or Firm — Wilmer Cutler Pickering Hale and Dorr LLP

(57) ABSTRACT

A color reproduction method comprises: inputting a first color gamut and a second color gamut; applying, to the first color gamut, a first color correction in which color adaptation is taken into consideration on a basis of reference white in the first color gamut and the second color gamut and a second color correction for matching basic colors in the first color gamut and the second color gamut with each other; applying, to a first color gamut to which the first color correction and the second color correction are applied, a third color correction for correcting a color that is present in colors outside of the second color gamut to colors on a surface or inside of the second color gamut; and generating color conversion information for converting the first color gamut into the second color gamut.

18 Claims, 11 Drawing Sheets

(52) U.S. Cl.
CPC ............... *G09G 2320/0606* (2013.01); *G09G 2320/0666* (2013.01); *G09G 2320/0693* (2013.01); *G09G 2340/06* (2013.01)

(58) Field of Classification Search
CPC ...... H04N 1/6052; H04N 1/6058; H04N 1/60; G09G 5/06; G09G 2320/0242; G06F 3/13; G60F 3/1431; G03F 3/08; G06K 9/03
See application file for complete search history.

(56) References Cited

U.S. PATENT DOCUMENTS

| | | | | |
|---|---|---|---|---|
| 6,781,716 | B1* | 8/2004 | Yoda | H04N 1/6058 358/1.9 |
| 8,144,984 | B2* | 3/2012 | Sawada | H04N 5/23287 358/520 |
| 2007/0058181 | A1 | 3/2007 | Hatori | |
| 2007/0223016 | A1* | 9/2007 | Ichitani | G06T 11/001 358/1.9 |
| 2008/0279451 | A1 | 11/2008 | Shimbaru | |
| 2009/0285475 | A1* | 11/2009 | Suzuki | H04N 1/6058 382/162 |
| 2010/0194773 | A1* | 8/2010 | Pan | G09G 5/02 345/590 |
| 2010/0214315 | A1* | 8/2010 | Nguyen | G09G 5/06 345/603 |

FOREIGN PATENT DOCUMENTS

| | | |
|---|---|---|
| JP | 2007-081480 A | 3/2007 |
| JP | 2007-081684 A | 3/2007 |
| JP | 2007-259124 A | 10/2007 |
| JP | 2008-118335 A | 5/2008 |
| JP | 2008-278056 A | 11/2008 |
| JP | 2008-288983 A | 11/2008 |

OTHER PUBLICATIONS

Color Management & ICC Color Profiles, May 2009 (Year: 2009).*
International Search Report corresponding to PCT/JP2013/056175, dated May 21, 2013 (5 pages).

* cited by examiner

FIRST COLOR GAMUT
SECOND COLOR GAMUT

SYSTEM AND METHOD FOR REPRODUCING COLOR IMAGE WITH SUPPOSED REPRODUCED COLOR GAMUTS

CROSS-REFERENCE TO RELATED APPLICATIONS

This application is a national stage application of International Application No. PCT/JP2013/056175 entitled "Color Reproduction Method, Color Reproduction System, Color Reproduction Program, and Color Reproduction Apparatus," filed on Mar. 6, 2013, which claims the benefit of the priority of Japanese Patent Application No. 2012-052107, filed on Mar. 8, 2012, the disclosures of each of which are hereby incorporated by reference in their entirety.

TECHNICAL FIELD

The present invention relates to a color reproduction method, a color reproduction system, a color reproduction program, and a color reproduction apparatus. More specifically, the present invention relates to a color reproduction method, a color reproduction system, a color reproduction program, and a color reproduction apparatus capable of reproducing a color image in which a reproduced color gamut is supposed, or a color image having unbroken gradation by using a color gamut in a color image reproduction system or a color image apparatus at a maximum.

BACKGROUND ART

There is a problem that how a difference between color reproductions is absorbed in a color reproduction from a color space having a certain color gamut to a color space having a different color gamut.

An example of a related color reproduction method is disclosed in Patent Literature 1.

In Patent Literature 1, a method for providing a color conversion table creating program capable of easily adjusting clipping and compression in accordance with a user's taste is provided. Specifically, in the color conversion table creating program for creating a color conversion table for mapping a color in a first color gamut that is a color gamut of a first color device into a second color gamut that is a color gamut of a second color device, a computer is caused to execute the program comprising a color gamut information read step of reading information about the first color gamut and information about the second color gamut, a color conversion amount input step of inputting the amount of color conversion in a color gamut, and a mapping step of conducting mapping by changing a mixing ratio of mapping by clipping to mapping by compression in accordance with the input amount of color conversion when mapping is conducted on the basis of the read information about the first color gamut and the information about the second color gamut.

CITATION LIST

Patent Literature

[Patent Literature 1] Japanese Laid-open Patent Publication No. 2008-118335

SUMMARY OF INVENTION

Technical Problem

In a method of Patent Literature 1 described in Background Art, because clipping is adopted to a color outside of a color gamut, gradation of the color in an original color space is not kept. Specifically, a plurality of colors reproduced as different colors in the color gamut of a first color device are reproduced as one color on a surface of the color gamut in a second color device, and therefore an image reproduced on the second color device is not necessarily optimum. As described above, there is a problem that in the method of Patent Literature 1, gradation in the image normally reproduced by the first color device cannot be normally reproduced by the second color device. In addition, there is a problem that in the second color device, about an arbitrary input color, a hue, saturation, and a value cannot be corrected in the range of the color gamut of the second color device, and therefore it is difficult to realize the color reproduction suiting the user's taste.

In view of the foregoing, it is an object of the present invention to provide a color reproduction method, a color reproduction system, and a color reproduction program in which when a color image a reproduced color gamut of which is supposed is reproduced in the color image system or the color image apparatus having a color gamut different from that of the color image, the color gamut of the color image system or the color image apparatus is effectively used and the gradation of the color image is kept.

Solution to Problem

In the present invention, a color reproduction method includes inputting a first color gamut on an input side and a second color gamut on an output side; applying, to the first color gamut, a first color correction in which color adaptation is taken into consideration on the basis of reference white in the first color gamut and the second color gamut and a second color correction for matching basic colors in the first color gamut and the second color gamut with each other; applying, to a first color gamut to which the first color correction and the second color correction are applied, a third color correction for correcting a color that is present in colors outside of the second color gamut to colors on a surface or inside of the second color gamut; and generating color conversion information for converting the first color gamut into the second color gamut.

In the present invention, a color reproduction system includes means for reading a first color gamut on an input side and a second color gamut on an output side; a first color correction means for performing a first color correction in which color adaptation is taken into consideration on the basis of reference white in the first color gamut and the second color gamut; a second color correction means for performing a second color correction for matching basic colors in the first color gamut and the second color gamut with each other; and a third color correction means for performing a third color correction for correcting a color that is present in colors outside of the second color gamut to colors on a surface or inside of the second color gamut with respect to the first color gamut to which the first color correction and the second color correction are applied, wherein color conversion information for converting the first color gamut into the second color gamut is generated.

In the present invention, a program for causing a computer to execute a procedure for reading a first color gamut on an input side and a second color gamut on an output side; a first color correction procedure for performing a first color correction in which color adaptation is taken into consideration on the basis of reference white in the first color gamut and the second color gamut; a second color correction procedure for performing a second color correction for matching basic colors in the first color gamut and the second color gamut with each other; and a third color correction procedure for performing a third color correction for correcting a color that is present in colors outside of the second color gamut to colors on a surface or inside of the second color gamut with respect to the first color gamut to which the first color correction and the second color correction are applied, wherein color conversion information for converting the first color gamut into the second color gamut is generated.

Advantageous Effect of Invention

According to the present invention, in a color image system or a color image apparatus having a color gamut different from the color gamut a color image of which is supposed, a color reproduction in which gradation is kept can be realized.

DESCRIPTION OF EMBODIMENTS

First Embodiment

A first embodiment of the present invention will be described in detail below with reference to the accompanying drawings.

Figure 1:
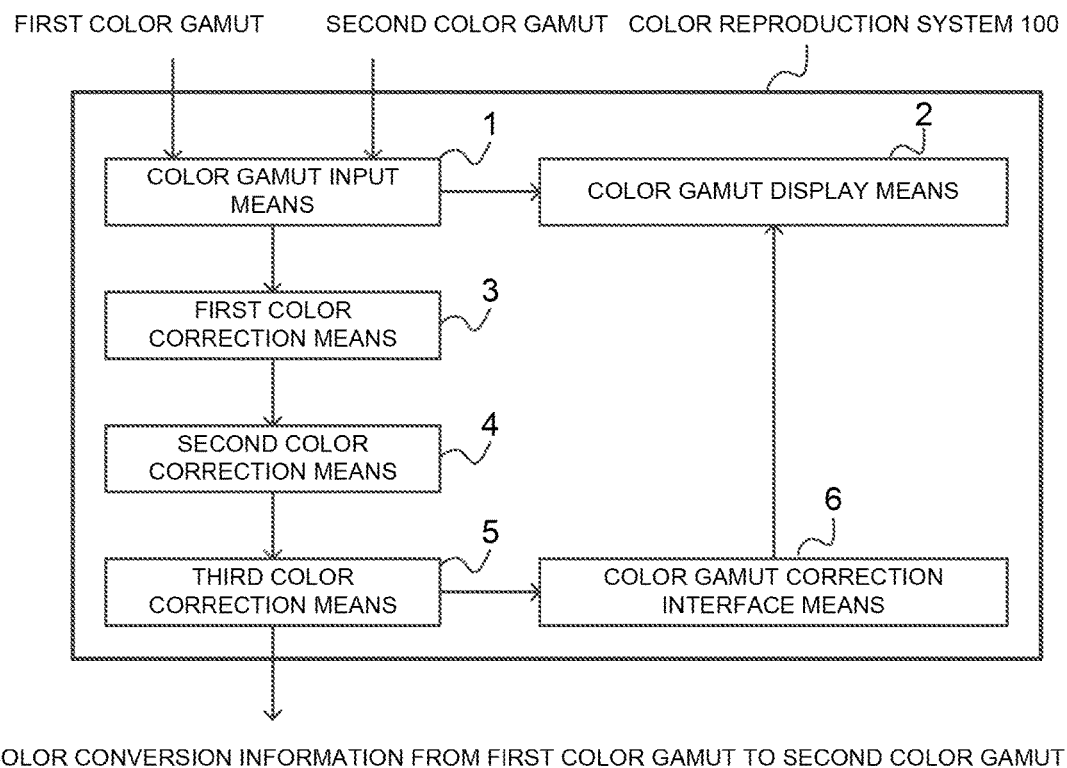
FIG. 1 is a block diagram showing a configuration according to a first embodiment of the present invention.

FIG. 1 is a block diagram showing a color reproduction system 100 of the first embodiment.

The color reproduction system 100 according to the first embodiment of the present invention inputs a first color gamut and a second color gamut, and outputs color conversion information from the first color gamut to the second color gamut. Further, the color reproduction system 100 includes a color gamut input means 1, a color gamut display means 2, a first color correction means 3, a second color correction means 4, a third color correction means 5, and a color gamut correction interface means 6.

An outline of operations of these means is as described below.

The color gamut input means 1 reads a first color gamut being a color gamut on the input side and a second color gamut being a color gamut on the output side.

The color gamut display means 2 displays the first color gamut and the second color gamut on a color space. Here, examples of the color space include a uniform color space CIELAB, HSV (H: Hue, S: Saturation, V: Value), and the like.

When reference white of the first color gamut and that of the second color gamut are different from each other, the first color correction means 3 applies to the first color gamut a color correction in which color adaptation of human beings is taken into consideration.

The second color correction means 4 applies a color correction so that a basic color in the first color gamut to which the color correction is applied by the first color correction means 3 is matched with a corresponding basic color in the second color gamut.

When a color positioned outside of the second color gamut is still present in the first color gamut to which a color gamut conversion through the second color correction means 4 is applied, the third color correction means 5 performs a color correction so that the color is a color on a surface or inside of the second color gamut.

When the color correction of the third color correction means 5 is applied, the color gamut correction interface means 6 selects a color to be corrected from the first color gamut displayed on the color gamut display means 2 and provides to a user a parameter by which the selected color is corrected.

When a color of the first color gamut is corrected to a color on a surface or inside of the second color gamut, the color reproduction system 100 collectively outputs a series of correction results as the color conversion information from the first color gamut to the second color gamut.

Next, the entire operations of the present embodiment will be described in detail with reference to flowcharts of FIGS. 1 and 2.

Figure 2:
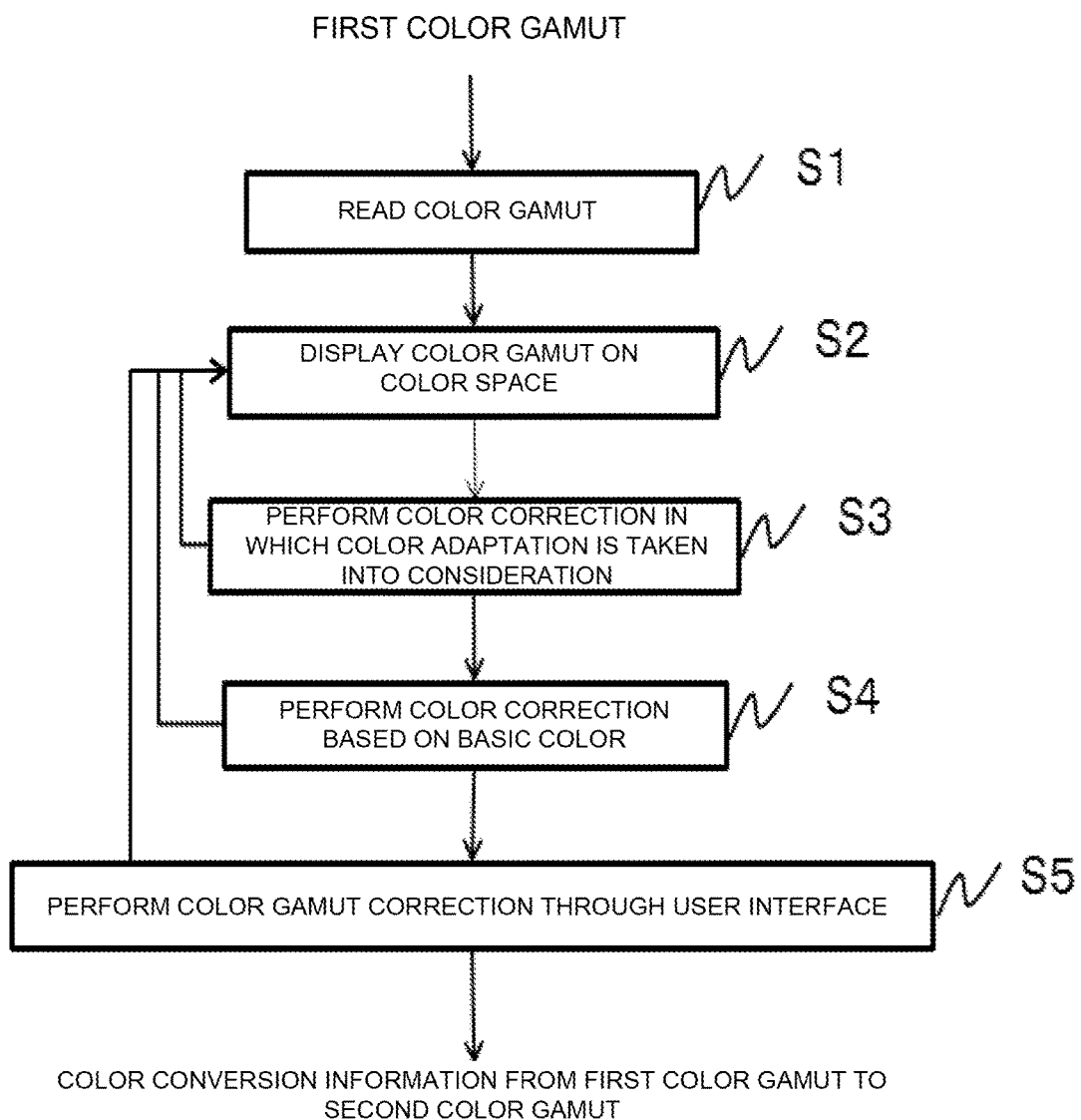
FIG. 2 is a flowchart showing operations of the first embodiment.

As shown in the flowchart of FIG. 2, in the entire operations of the present embodiment, a read step of the color gamut (S1), a color space display step of the color gamut (S2), a color correction step in which the color adaptation is taken into consideration (S3), a color correction step based on the basic colors (S4), and a color gamut correction step through the user interface (S5) are operated in order. Each step will be described.

First, in the read step of the color gamut (S1), information about the first color gamut as an input color space and information about the second color gamut as an output color space are read. Here, these color gamuts are regions to which a correspondence relationship between device colors for expressing colors such as RGB or CMYK and tristimulus values XYZ is known. For example, the color gamut in which a transformation matrix and gamma characteristics between the RGB and the tristimulus values XYZ are mutually defined like sRGB may be used, or the color gamut in which a color reproduced by a color image device is actually measured may be used.

The color gamut input means 1 operates like the above S1.

Figure 3:
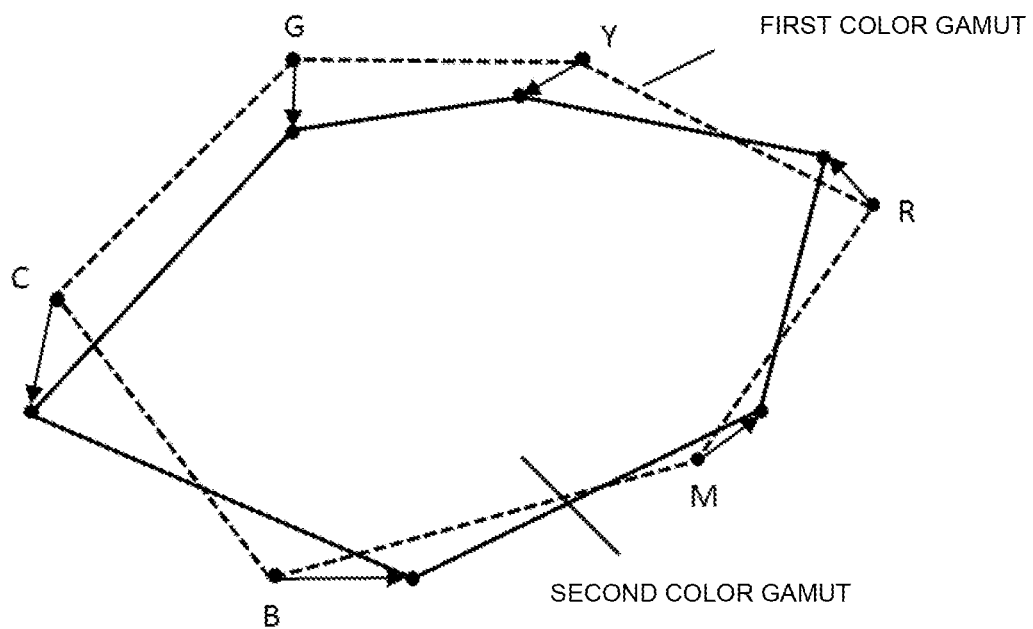
FIG. 3 is a view showing a specific example in which a first color gamut and a second color gamut are displayed on a color space.

In the color space display step of the color gamut (S2), the read first and second color gamuts are displayed on the color space. Here, a color space such as the tristimulus values XYZ, the uniform color space CIELAB, or the HSV (H: Hue, S: Saturation, V: Value) can be used as the color space. FIG. 3 shows an example in which the first color gamut and the second color gamut are displayed on the uniform color space CIELAB. Here, the color gamut indicated by using a dotted line is set to be expressed as the first color gamut, and the color gamut indicated by using a solid line is set to be expressed as the second color gamut.

The color gamut display means 2 operates like the above S2.

In the color correction step in which the color adaptation is taken into consideration (S3), when the reference white in the first color gamut and the reference white in the second color gamut are different from each other, the color correction in which the color adaptation of human beings is taken into consideration is applied to the first color gamut. Suppose that the reference white of two color gamuts are different from each other, or even if the two reference white are the same, observation environments are different from each other. In this case, even if the tristimulus values XYZ are matched with each other, the tristimulus values XYZ may fail to be perceived as the same color to human beings. The color adaptation conversion is the above-described color correction process for compensating a phenomenon about an observation of colors for human beings, and various methods such as von Kries, CIECAM02, and Japanese Laid-open Patent Publication No. 2000-113174 are proposed. In the present embodiment, the color adaptation conversions are applicable.

The first color correction means 3 operates like the above S3.

Figure 4:
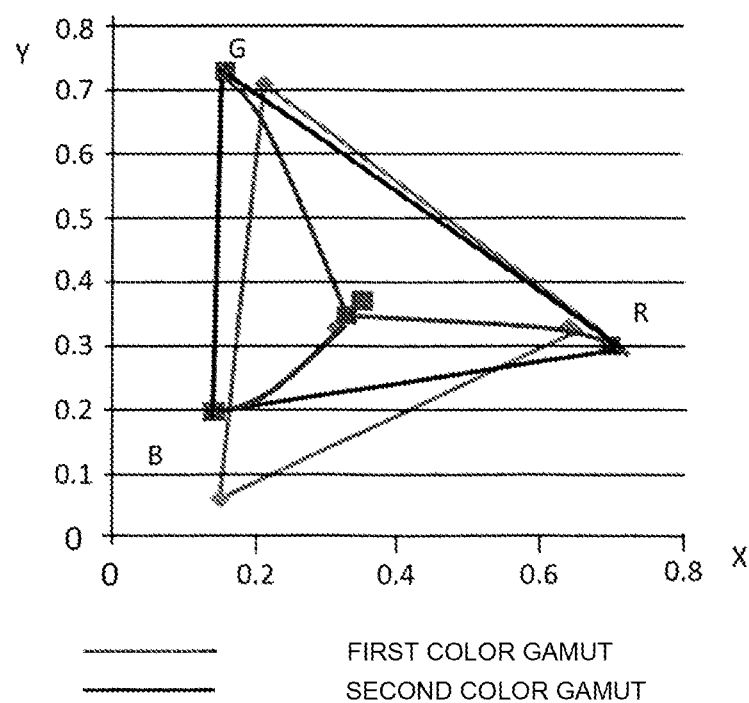
FIG. 4 is a view showing a concept of a color correction based on basic colors of a second color correction means.

In the color correction step based on the basic colors (S4), the color correction for matching the basic color in the first color gamut with the corresponding basic color in the second color gamut is applied to the first color gamut. FIG. 4 is a view showing a concept of the color correction based on the basic colors.

In this figure, a state in which two color gamuts in which the color device is RGB are indicated by using an xy chromaticity diagram is shown. It is understood that coordinate positions of R, G, and B being the basic colors in the two color gamuts are different from each other. In the color correction based on the basic colors, because hues may be different from each other, the basic colors in the first color gamut on the input side are reproduced by the basic colors in the second color gamut on the output side. Further, as the basic colors are more approximated to an achromatic color, the basic colors in the first color gamut on the input side are reproduced by colors more approximated to an original color in the first color gamut on the input side. The color correction based on this basic color has the advantage of being able to effectively use the color gamut on the output side.

Calculation procedures of the color correction based on the basic colors will be described below. Here, a color device of the first color gamut will be described as RGB.

First, R (255, 0, 0), G (0, 255, 0), B (0, 0, 255), C (0, 255, 255), M (255, 0, 255), and Y (255, 255, 0) in the first color gamut are set to the basic colors. Further, the first color correction, namely, the color correction in which the color adaptation of human beings is taken into consideration is applied, and then the tristimulus values XYZ of each basic color are calculated and further L*a*b* of the uniform color space CIELAB is calculated.

Next, on the basis of the tristimulus values XYZ corresponding to six basic colors, namely, R (255, 0, 0), G (0, 255, 0), B (0, 0, 255), C (0, 255, 255), M (255, 0, 255), and Y (255, 255, 0) in the second color gamut, the L*a*b* is calculated.

Figure 5:
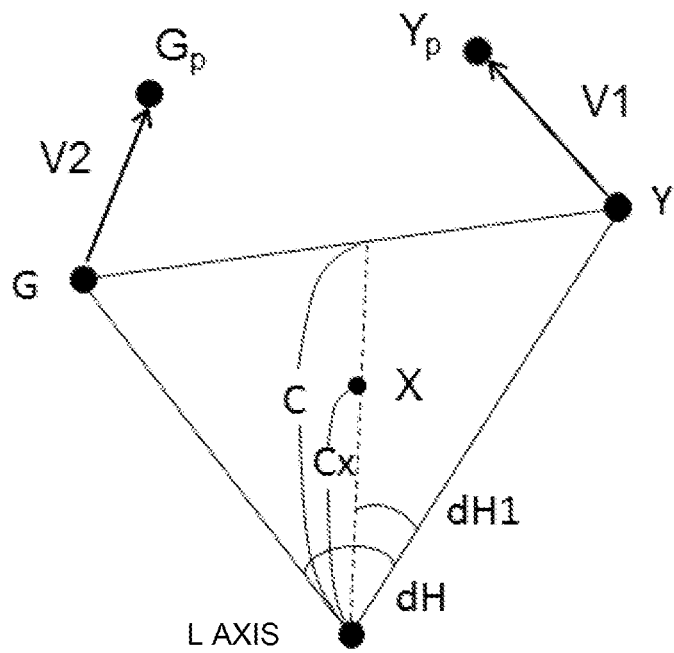
FIG. 5 is a view showing a specific example of the color correction based on the basic colors of the second color correction means.

A correction vector to the basic color in the first color gamut on the input side to which the first color correction is applied and a correction vector to the corresponding basic color in the second color gamut are calculated in the uniform color space CIELAB. FIG. 5 shows the color correction to a space extending between Y and G in the first color gamut by using a two-dimensional plane a*b*. The Y and G are Y and G in the first color gamut on the input side to which the first color correction is applied, and Yp and Gp are Y and G in the second color gamut. A correction vector V1 at the time when mapping is conducted from Y ($L_y$, $a_y$, $b_y$) to Yp ($L_{py}$, $a_{py}$, $b_{py}$) is represented by the following equation.

$$\text{Correction vector} = (L_{py}, a_{py}, b_{py}) - (L_y, a_y, b_y) \quad (1)$$

In the similar fashion, the correction vectors are calculated also about the residual basic colors (R, G, B, C, M).

Next, a method for applying the second color correction to colors except the basic colors will be described.

In the second color correction with respect to the colors except the basic colors, on the basis of characteristics in which as a color is more approximated to an achromatic color, a color perception of human beings becomes sharper, a color correction in which a color to be corrected is far away from a white color as shown in FIG. 4, namely, as the saturation becomes higher, corrected intensity is more intensified is applied.

A correction vector Vx that is allowed to act on a point X in the Lab space in the first color gamut on the input side to which the first color correction is applied is calculated. An example of the second color correction will be described with reference to the example of FIG. 5. In this case, the point X is present in the color space extending between the Y and the G. In this case, the correction vector Vx that is allowed to act on the X is calculated by using the correction vectors V1 and V2 in which the Y and the G are calculated. First, a hue H and saturation C of Y, G, and the point X in the first color gamut on the input side to which the first color correction is applied are calculated, respectively. A hue angle between the Y and the G is set to dH, and a hue angle between the Y and the X is set to dH1. Saturation $C_X$ of the X is calculated, and at the same time, Y, G, and X are projected onto the ab plane. Further, an intersection point of a segment GY in which G is connected to Y on the ab plane and a straight line passing through the X and the L axis on the ab plane is calculated, and the saturation C of the intersection point is calculated.

Next, a correction vector Vh that contributes to a hue component is calculated.

$$Vh = (1 - dH1/dH) \cdot V1 + (dH1/dH) \cdot V2 \quad (2)$$

Further, a contribution of a saturation component is reflected on the correction vector Vh, and the correction vector Vx that acts on the point X is calculated.

$$Vx = Cx/C \cdot Vh \quad (3)$$

A result in which the correction vector Vx is applied to the point X in the uniform color space CIELAB is a result of the second color correction with respect to the colors except the basic colors.

Further, color device values RGB in the second color gamut corresponding to the L*a*b* in the uniform color space CIELAB to which the second color correction is applied are calculated. Now, in the case where a correspondence relationship between the tristimulus values XYZ and the color device values in the second color gamut is defined as a standard color space such as sRGB or AdobeRGB, the color device values RGB can be easily calculated in accordance with the specified equation. On the other hand, in the case where the correspondence relationship between the tristimulus values XYZ and the color device values is not defined by using the equation in the second color gamut, the color device values are calculated on the basis of the correspondence relationship between the tristimulus values XYZ and the color device values RGB obtained by the measurement. A method for calculating the color device values of this case will be described.

Figure 6:
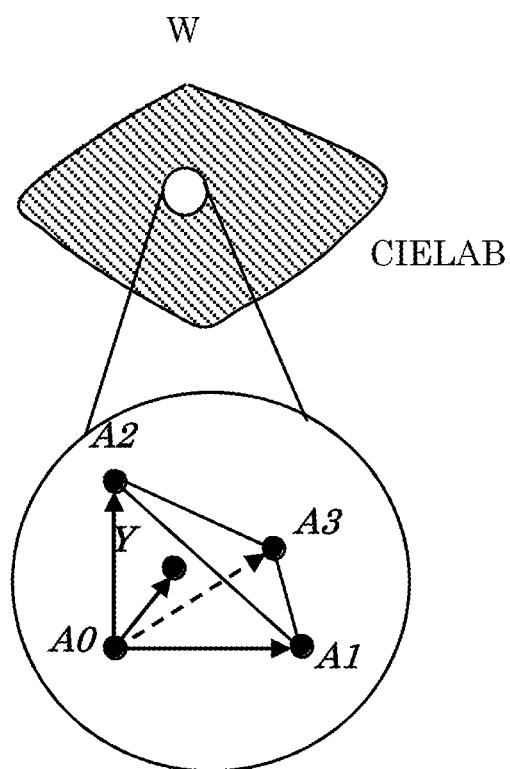
FIG. 6 is a view showing a state in which the second color gamut is divided by a trigonal pyramid in which measuring points are used as vertexes.

The correspondence relationship between the tristimulus values XYZ and the color device values in the second color gamut is supposed to be obtained by the measurement. The L*a*b* is calculated on the basis of the tristimulus values XYZ being the measuring points and the correspondence relationship between the L*a*b* and the color device values is obtained. Then, a trigonal pyramid in which adjacent measuring points are used as vertexes is created. Thereby, the second color gamut in the uniform color space CIELAB is tightly filled with the trigonal pyramids in which the measuring points are used as the vertexes. As shown in FIG. 6, the second color gamut in the uniform color space CIELAB is supposed to be divided by the trigonal pyramid in which the adjacent measuring points are used as the vertexes. The point Y in the uniform color space CIELAB is considered. In the case where the point Y is present in the second color gamut, the point Y is necessarily present inside of a piece of the trigonal pyramid in which the measuring points are used as the vertexes. As shown in FIG. 6, in the case where the point Y is present in the trigonal pyramid in which A0, A1, A2, and A3 are used as the vertexes, all of the following condition equations (4), (5), and (6) are satisfied.

$$\vec{X} - \vec{A0} = a(\vec{A1} - \vec{A0}) + b(\vec{A2} - \vec{A0}) + b(\vec{A3} - \vec{A0}) \quad (4)$$

$$a, b, c \geq 0 \quad (5)$$

$$a + b + c \leq 1 \quad (6)$$

Herein, $\vec{X}$ and $\vec{Ai}$ (i=0 to 3) denote position vectors from an origin in the CIELAB color space.

About the point Y, the trigonal pyramid that satisfies the condition equations (4) to (6) may be searched for from among all the trigonal pyramids constituting the second color gamut. Further, when the point Y is positioned on a surface or a vertex of the trigonal pyramid, a plurality of the trigonal pyramids satisfy the condition equations (4) to (6). In that case, any one of the trigonal pyramids may be selected.

Next, the color device values C in the second color gamut corresponding to the point Y are calculated. Now, when the color device values corresponding to the vertexes A0, A1, A2, and A3 of the trigonal pyramid including the point Y are set to C0, C1, C2, and C3, the color device value C is represented by the following equation.

$$C = (1-a-b-c)C0 + a \cdot C1 + b \cdot C2 + c \cdot C3 \quad (7)$$

Here, coefficients a, b and c are the same coefficients as those in the equation 4.

The second color correction means 4 operates like the above S4.

Next, the color gamut correction step through the user interface (S5) will be described. In the case where in the first color gamut to which the color correction step in which the color adaptation is taken into consideration (S3) and the color correction step based on the basic colors (S4) are applied, a color is still present outside of the second color gamut, a color of the first color gamut is further required to corrected to a color on a surface or inside of the second color gamut. Here, by the use of the first and second color gamuts displayed on the color space display step of the color gamut (S2) and the user interface for the color gamut correction, such a color is corrected.

Figure 7:
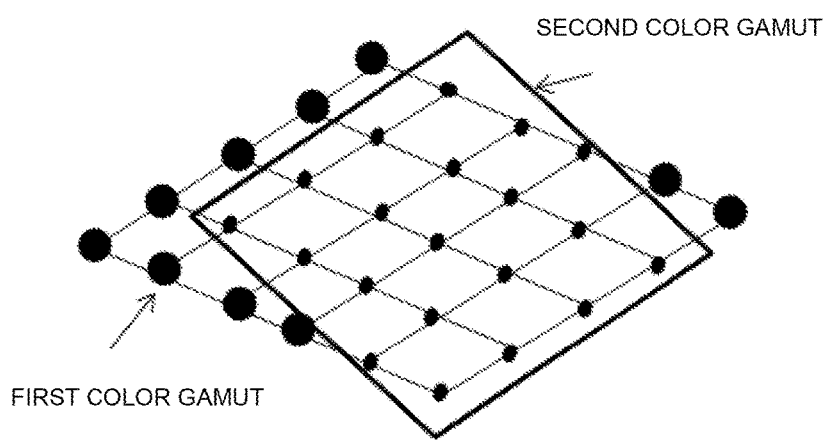
FIG. 7 is a view showing inside and outside determination results of the second color gamut of colors in the first color gamut.

Now, from the first color gamut to which the color correction step in which the color adaptation is taken into consideration (S3) and the color correction step based on the basic colors (S4) displayed on the color space display step of the color gamut (S2) are applied, a color outside of the second color gamut is selected. Here, about the inner/outer determination of the second color gamut, whether the trigonal pyramids constituting the second color gamut that satisfy the condition equations (4) to (6) are present can be easily determined. As shown in FIG. 7, in the color space display step of the color gamut (S2), by changing a color displaying the point or a size of the point, colors constituting the first color gamut that are determined to be outside of the second color gamut can be displayed so that the user easily selects colors outside of the color gamut. Further, FIG. 7 is an example in which colors constituting the first color gamut that are determined to be inside of the second color gamut and colors constituting the first color gamut that are determined to be outside of the second color gamut are displayed by changing the size of the point so that the user easily selects a color outside of the color gamut.

Figure 8:
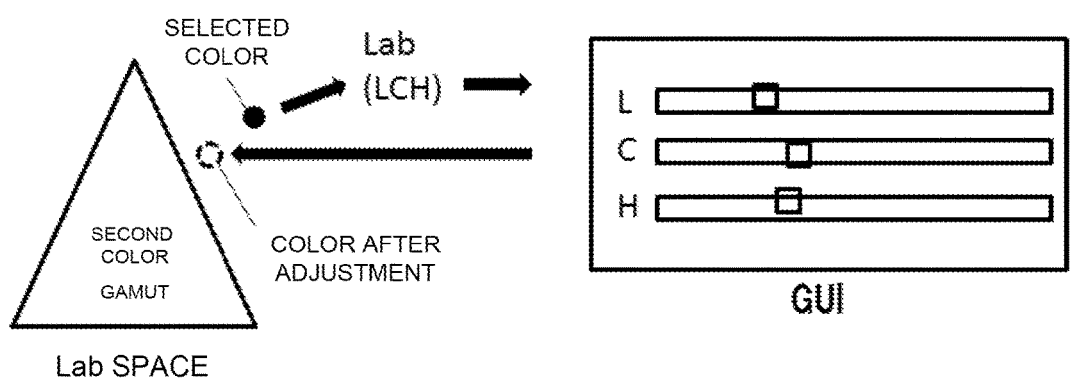
FIG. 8 is a view showing an example of a user interface for a color gamut correction used in a third color correction means.

About the color correction to the color outside of the second color gamut selected by the user, the user interface for determining parameters in the color gamut correction as shown in FIG. 8 is proposed and the parameters are determined. In FIG. 8, an LCH calculated on the basis of (L*, a*, b*) of the selected color is displayed. Here, L denotes the value and is L*. C denotes the saturation and H denotes the hue. C and H are calculated by the following equations.

$$C = \sqrt{a^{*2} + b^{*2}} \quad (8)$$

$$H = \arctan(b^*/a^*) \quad (9)$$

Here, the hue H is indicated by using radian, and further when the hue H is indicated by an angle H', the hue H is calculated below.

$$H' = 180 - H/\pi \quad (10)$$

Here, in the case of H'<0

$$H' = 180 - H/\pi + 360 \quad (11)$$

The correction amount to each component of the LCH calculated by the above (8) to (11) of the selected color is specified by the user interface shown in FIG. 8. In the case of the interface of FIG. 8, each component of the selected LCH is corrected while the color is controlled by a slide bar so that the color is a color on a surface or inside of the second color gamut. When a color to be corrected is a color on a surface or inside of the second color gamut during the correction, a color or a size indicating the point changes in conjunction with each other as shown in FIG. 7.

Here, the correction amount to the selected color or also to the adjacent colors is applied in the form of gradually weakening the correction amount and the correction is geared. Thereby, a reversal phenomenon of the color can be avoided. Further, a plurality of colors that are present around a color desired to be corrected are selected and corrected at the same time, and thereby an operating efficiency in this step is improved.

When all the colors in the first color gamut are corrected to a color on a surface or inside of the second color gamut, the color gamut correction step through the user interface (S5) is ended.

The third color correction means 5 operates like the above S5, and the color gamut correction interface means 6 is realized, for example, by the user interface shown in FIG. 8.

In the color correction through the user interface, to the colors outside of the color gamut on the output side, clipping is not applied and a reversal of the color is not generated. Therefore, the color reproduction in which gradation is kept can be realized. Further, the color reproduction suiting the user's taste can be realized on the basis of the color correction through the user.

Through the above steps, color conversion information from the first color gamut to the second color gamut is generated. Here, the color conversion information from the first color gamut to the second color gamut can be output, for example, as a color conversion table in which the correspondence relationship between the color device values in the input color space and the color device values in the output color space is recorded.

Next, advantageous effects of the present embodiment will be described.

In the present embodiment, under conditions in which the color gamut on the input side and the color gamut on the output side are different from each other, by the configuration of the color correction step based on the basic colors and the color gamut correction step through the user interface, the color gamut on the output side can be effectively used and the color reproduction in which the gradation is kept can be realized. Further, the color reproduction suiting the user's taste can be realized.

In particular, in the color image system or the color image apparatus having the color gamut different from that supposed to be a color image, the color reproduction in which the gradation is kept can be realized. The reason is that the color gamut of the color image system or the color image apparatus is effectively used, and in particular the clipping is not applied to the colors outside of the color gamut in a process of the color reproduction.

Further, in the color image system or the color image apparatus having the color gamut different from that supposed in a color image, the color reproduction suiting the user's taste can be realized. The reason is that about an arbitrary color, the hue, the saturation, and the value can be corrected in the range of the color gamut of the color image system or the color image apparatus.

Second Embodiment

A second embodiment of the present invention will be described in detail below with reference to the accompanying drawings.

Figure 9:
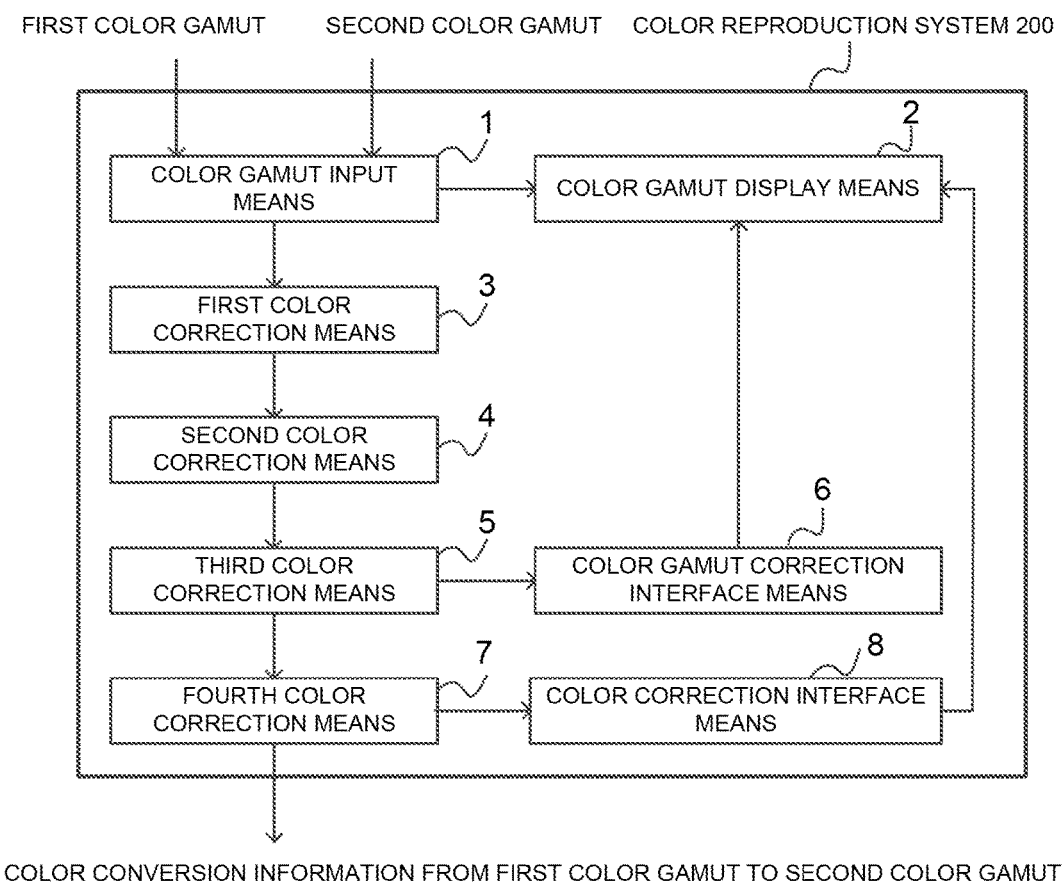
FIG. 9 is a block diagram showing a configuration according to a second embodiment of the present invention.

With reference to FIG. 9, a color reproduction system 200 of a preferred embodiment for embodying the second embodiment of the present invention has a configuration in which a fourth color correction means 7 and a color correction interface means 8 are added to the color reproduction system 100.

Here, the newly-added fourth color correction means 7 and color correction interface means 8 will be described.

The fourth color correction means 7 further provides the color correction suiting the user's taste to the color corrected so as to be reproduced in the second color gamut by applying the first to third color corrections to the first color gamut.

When the color correction in the fourth color correction means 7 is applied, the color correction interface means 8 selects a color to be corrected and provides to the user a parameter for correcting the selected color.

Next, the entire operations of the present embodiment will be described in detail with reference to flowcharts of FIGS. 9 and 10.

Figure 10:
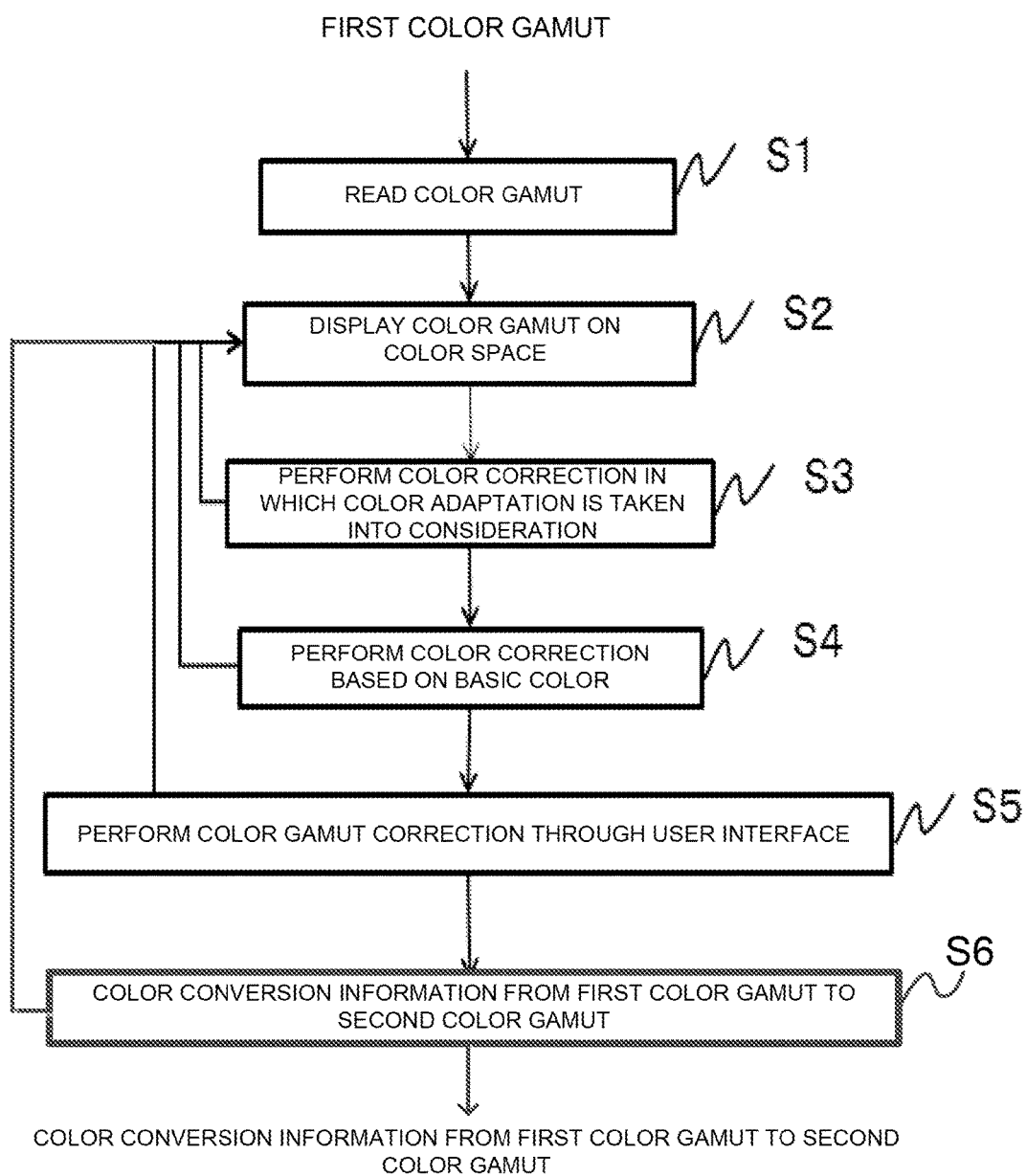
FIG. 10 is a flowchart showing operations of the second embodiment.

As shown in the flowchart of FIG. 10, in the entire operations of the present embodiment, a read step of the color gamut (S1), a color space display step of the color gamut (S2), a color correct step in which the color adaptation is taken into consideration (S3), a color correction step based on the basic colors (S4), a color gamut correction step through the user interface (S5), and a specific color correction through the user interface (S6) are operated in order. Here, the newly-added specific color correction through the user interface (S6) will be described.

In the specific color correction through the user interface (S6), to the color corrected so as to be reproduced in the second color gamut by applying the first to third color corrections to the first color gamut, the color correction is further applied so as to suit the user's taste.

Figure 11:
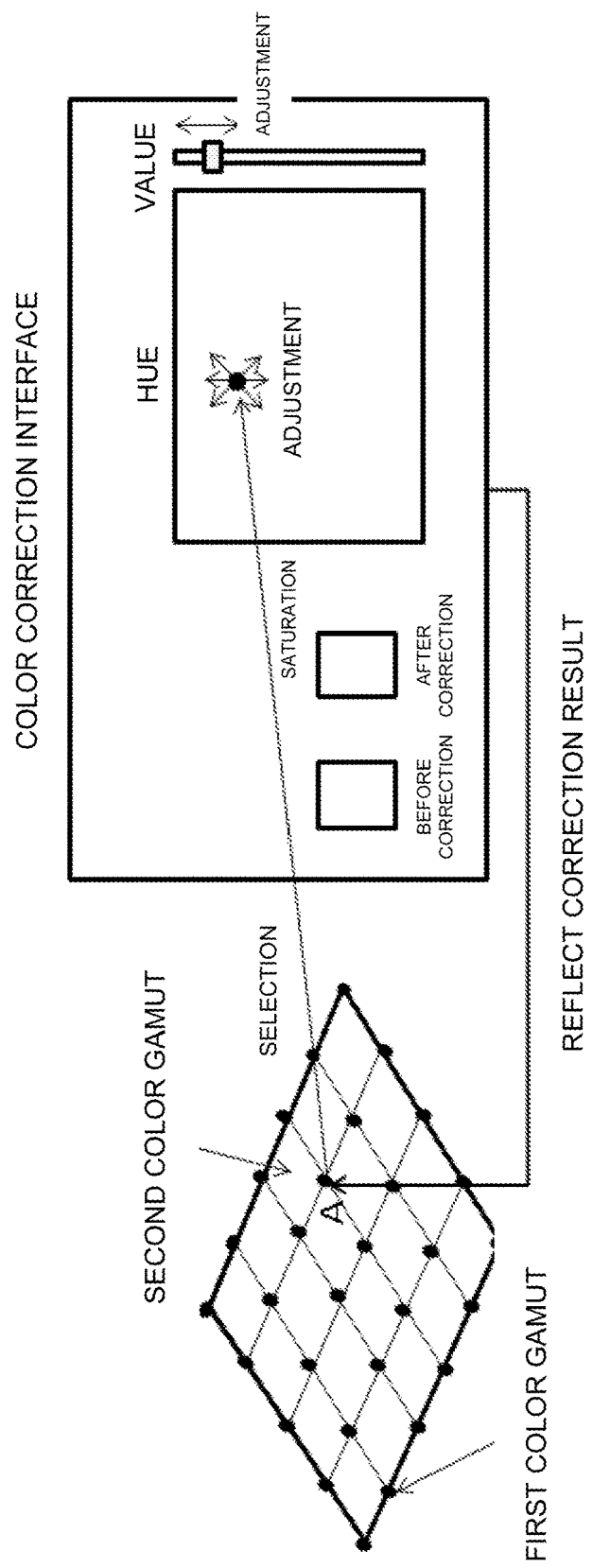
FIG. 11 is a view showing an example of the user interface for the color correction used in a fourth color correction means.

FIG. 11 shows an example of the user interface for the color correction to be used in S6. On the left side of FIG. 11, the first and second color gamuts displayed on the color gamut display means 2 are shown. Further, the first to third color corrections are applied to the first color gamut, and thereby an arbitrary color in the first color gamut indicates a state capable of being reproduced in the second color gamut. Now, the colors constituting the first color gamut that are displayed on the color gamut display means 2 are selected by a mouse operation of the computer. From the L*a*b* values of the selected colors, the hue, the saturation, and the value of the colors are calculated and plotted on a graph indicated by the hue-saturation on the interface for color correction on the right side of FIG. 11. In addition, the value of the graph indicated by the hue-saturation is indicated by the same value as that of the selected color. The plotted point is moved on the graph indicated by the hue-saturation, and thereby the hue and the saturation of the selected color can be corrected. Further, by changing an adjustment bar of the value, the value of the selected color can be corrected. A color before the correction and that after the correction of the selected color can be confirmed on the interface for color correction. Correction results in the interface for color correction are reflected on the first color gamut. Here, when the correction results are reflected on the first color gamut, only the selected color may be reflected or also colors around the selected color may be reflected. In the case where also the colors around the selected color are reflected, the correction amount is adjusted on the basis of a color difference, a hue difference, a saturation difference, and a value difference between the colors around the selected color and the selected color, and thereby the color reproduction with no uncomfortable feeling can be realized.

Further, results of the specific color correction through the user interface (S6) are reflected on the color conversion information from the first color gamut to the second color gamut.

The fourth color correction means 7 operates like the above S6, and the color correction interface means 8 provides the interface for the color correction performed by the fourth color correction means 7 as shown in FIG. 11.

Advantageous effects of the present embodiment will be described.

In the present embodiment, by the configuration of the specific color correction step through the user interface, when a color in the color gamut on the input side is reproduced by the color gamut on the output side, the color reproduction more suiting the user's taste can be realized.

Third Embodiment

A third embodiment of the present invention will be described in detail below with reference to the accompanying drawings.

Figure 12:
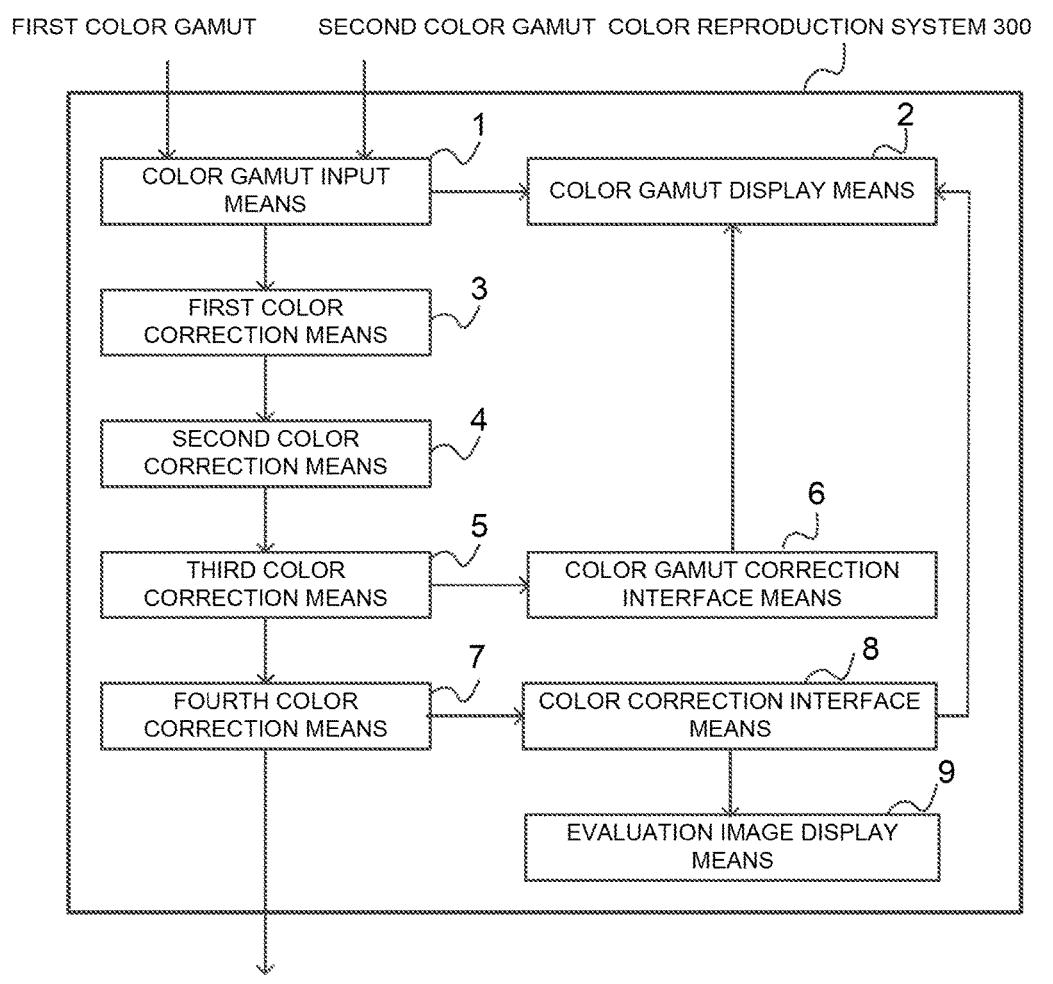
FIG. 12 is a block diagram showing a configuration according to a third embodiment of the present invention.

With reference to FIG. 12, a color reproduction system 300 according to the third embodiment of the present invention has a configuration in which an evaluation image display means 9 is added to the color reproduction system 200.

When the color correction is performed so as to suit the user's taste, the evaluation image display means 9 can select a color to be corrected from the proposed evaluation image and confirm advantageous effects of the color correction as an image, and provides a color correction function having higher user-friendliness.

About the basic operations, as shown in the flowchart of FIG. 10, a method for selecting a color to be corrected is different only in the specific color correction through the user interface (S6), and therefore the newly-added evaluation image display means 9 will be herein described.

Figure 13:
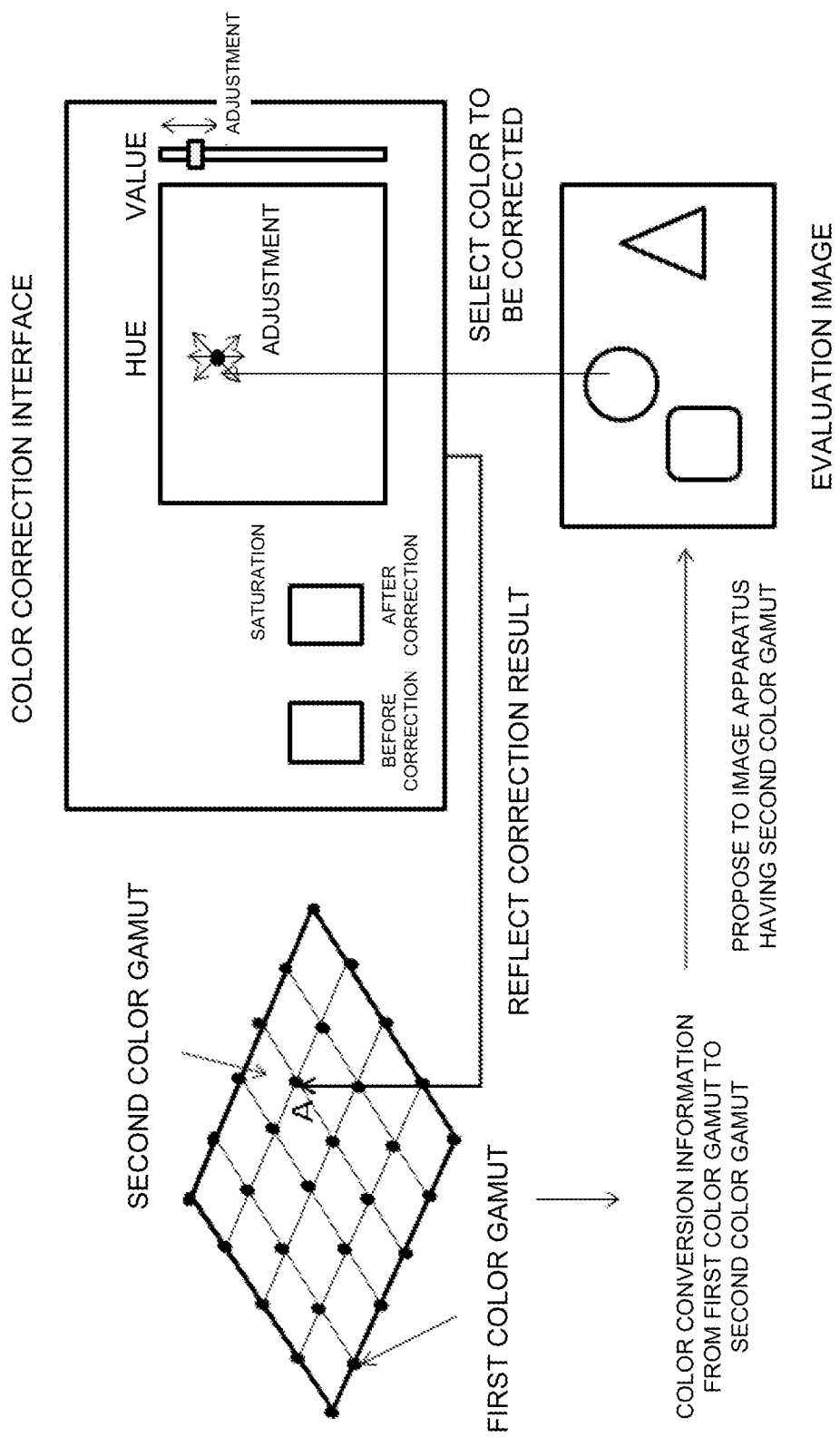
FIG. 13 is a view showing a specific color correction through the user interface according to the third embodiment of the present invention.

As shown in FIG. 13, the evaluation image display means 9 proposes, to the color image apparatus having the second color gamut, the evaluation image with the color on which the color conversion information from the first color gamut to the second color gamut is reflected. Here, various images such as a person image, a scenery image, and a CG image are supposed to be able to be prepared and selected as the evaluation image. The user is allowed to select a color to be corrected from the proposed evaluation images. The color correction to the selected color is as described in the above-described specific color correction through the user interface (S6).

Results of the specific color correction through the user interface (S6) are reflected on the color conversion information from the first color gamut to the second color gamut to be thereby proposed.

In the advantageous effects of the present embodiment, through the above-described configuration, when the color correction is performed so as to suit the user's taste, the color to be corrected can be selected from the proposed evaluation image and the advantageous effects of the color correction can be confirmed as an image. As a result, the color correction having higher user-friendliness can be realized.

First Example

Next, operations of preferred embodiments for embodying the present invention will be described with reference to specific examples.

Figure 14:
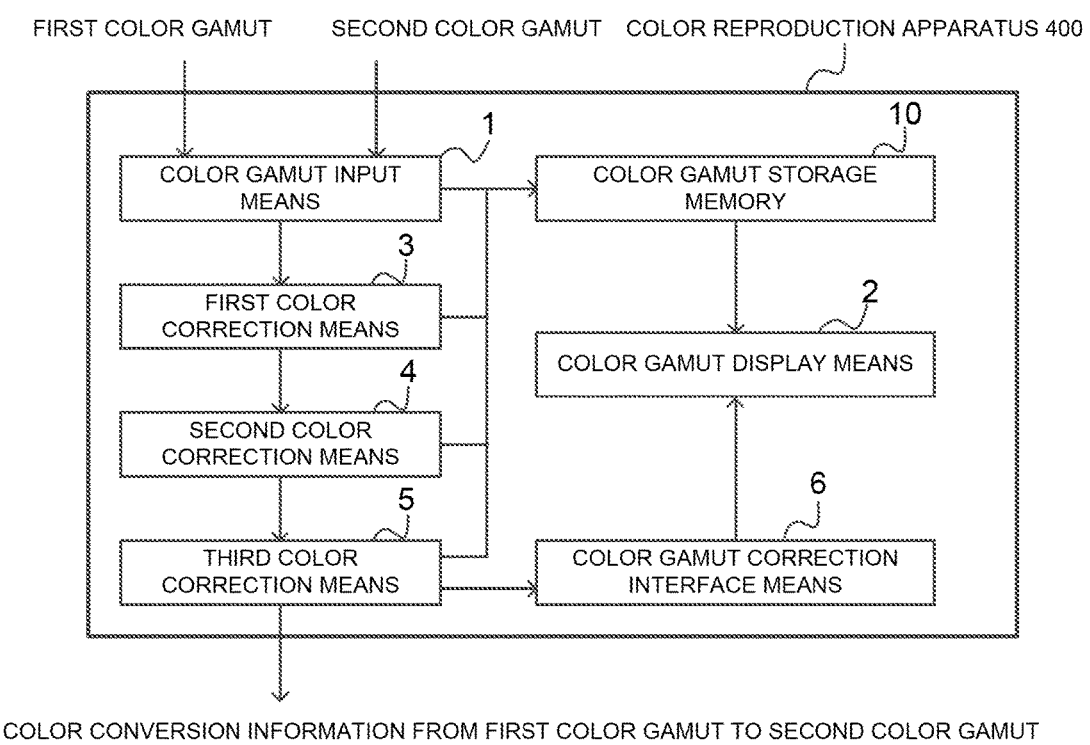
FIG. 14 is a block diagram showing examples of the present invention.

The color reproduction systems 100 to 300 according to the above-described first to third embodiments can be realized also as a program to be executed on the computer. Further, as shown in FIG. 14, the color reproduction systems 100 to 300 can be realized also as a color reproduction apparatus 400.

The color reproduction apparatus 400 inputs the first color gamut and the second color gamut, and outputs the color conversion information from the first color gamut to the second color gamut. The color reproduction apparatus 400 includes the color gamut input means 1, the color gamut display means 2, the first color correction means 3, the second color correction means 4, the third color correction means 5, the color gamut correction interface means 6, and a color gamut storage memory 10.

Each means of the color gamut input means 1, the color gamut display means 2, the first color correction means 3, the second color correction means 4, the third color correction means 5, and the color gamut correction interface means 6 carries out the same operations as those of the means described in the color reproduction system 100. The color gamut storage memory 10 is a memory that stores the first color gamut and the second color gamut by using the color gamut input means 1.

On the first color gamut stored in the color gamut storage memory 10, correction results of the first color correction means 3, the second color correction means 4, and the third color correction means 5 are reflected in each case.

As described above, the present invention is described with reference to preferred embodiments and examples. Further, the present invention is not necessarily limited to the above embodiments and examples, but can be variously verified and performed in a range of technical idea.

Further, part or the whole of the above embodiments can be described like the following supplementary notes; however, is not limited thereto.

(Supplementary Note 1)

A color reproduction method including:

inputting a first color gamut on an input side and a second color gamut on an output side;

applying, to the first color gamut, a first color correction in which color adaptation is taken into consideration on the basis of reference white in the first color gamut and the second color gamut and a second color correction for matching basic colors in the first color gamut and the second color gamut with each other;

applying, to a first color gamut to which the first color correction and the second color correction are applied, a third color correction for correcting a color that is present in colors outside of the second color gamut to colors on a surface or inside of the second color gamut; and generating color conversion information for converting the first color gamut into the second color gamut.

(Supplementary Note 2)

The color reproduction method described in the supplementary note 1, wherein with respect to colors except basic colors, the second color correction is a color correction in which as saturation is higher, corrected intensity is more intensified.

(Supplementary Note 3)

The color reproduction method described in the supplementary note 1 or 2, wherein in the second color correction, to the colors except the basic colors, a color correction is performed on the basis of color correction information about two basic colors interleaving the color except the basic colors.

(Supplementary Note 4)

The color reproduction method described in any one of the supplementary notes 1 to 3, wherein in the third color correction, the second color gamut and a color gamut in which the first color correction and the second color correction are applied to the first color gamut are displayed on a color space, and a color that is present in the colors outside of the second color gamut is selected by a user interface, and is corrected to colors on a surface or inside of the second color gamut.

(Supplementary Note 5)

The color reproduction method described in any one of the supplementary notes 1 to 4, wherein from colors constituting the first color gamut that constitute the color conversion information, a fourth color correction for changing a parameter of the color selected by the user interface is performed.

(Supplementary Note 6)

The color reproduction method described in the supplementary note 5, wherein in the fourth color correction, a color to be corrected is selected from colors of an evaluation image proposed on an image apparatus having the second color gamut.

(Supplementary Note 7)

A color reproduction system including:

a means configured to read a first color gamut on an input side and a second color gamut on an output side;

a first color correction means configured to perform a first color correction in which color adaptation is taken into consideration on the basis of reference white in the first color gamut and the second color gamut;

a second color correction means configured to perform a second color correction for matching basic colors in the first color gamut and the second color gamut with each other; and a third color correction means configured to perform a third color correction for correcting a color that is present in colors outside of the second color gamut to colors on a surface or inside of the second color gamut with respect to the first color gamut to which the first color correction and the second color correction are applied, wherein color conversion information for converting the first color gamut into the second color gamut is generated.

(Supplementary Note 8)

The color reproduction system described in the supplementary note 7, wherein with respect to the colors except the basic colors, the second color correction means performs a color correction in which as saturation is higher, corrected intensity is more intensified.

(Supplementary Note 9)

The color reproduction system described in the supplementary note 7 or 8, wherein with respect to the colors except the basic colors, the second color correction means performs a color correction on the basis of color correction information about two basic colors interleaving the color except the basic colors.

(Supplementary Note 10)

The color reproduction system described in any one of the supplementary notes 7 to 9, wherein the third color correction means displays, on a color space, the second color gamut and a color gamut in which the first color correction and the second color correction are applied to the first color gamut, selects a color that is present in the colors outside of the second color gamut by a user interface, and corrects the above color to colors on a surface or inside of the second color gamut.

(Supplementary Note 11)

The color reproduction system described in any one of the supplementary notes 7 to 10, further including a fourth color correction means for changing a parameter of the color selected by the user interface from colors constituting the first color gamut that constitute the color conversion information.

(Supplementary Note 12)

The color reproduction system described in the supplementary note 11, wherein the fourth color correction means selects a color to be corrected from colors of an evaluation image proposed on an image apparatus having the second color gamut.

(Supplementary Note 13)

A program for causing a computer to execute:

a procedure for reading a first color gamut on an input side and a second color gamut on an output side;

a first color correction procedure for performing a first color correction in which color adaptation is taken into consideration on the basis of reference white in the first color gamut and the second color gamut;

a second color correction procedure for performing a second color correction for matching basic colors in the first color gamut and the second color gamut with each other; and a third color correction procedure for performing a third color correction for correcting a color that is present in colors outside of the second color gamut to colors on a surface or inside of the second color gamut with respect to the first color gamut to which the first color correction and the second color correction are applied, wherein color conversion information for converting the first color gamut into the second color gamut is generated.

(Supplementary Note 14)

The program described in the supplementary note 13, wherein with respect to the colors except the basic colors, the second color correction procedure is a procedure for performing a color correction in which as saturation is higher, corrected intensity is more intensified.

(Supplementary Note 15)

The program described in the supplementary note 13 or 14, wherein with respect to the colors except the basic colors, the second color correction procedure is a procedure for performing a color correction on the basis of color correction information about two basic colors interleaving the color except the basic colors.

(Supplementary Note 16)

The program described in any one of the supplementary notes 13 to 15, wherein the third color correction procedure is a procedure for displaying, on a color space, the second color gamut and a color gamut in which the first color correction and the second color correction are applied to the first color gamut, selecting a color that is present in the colors outside of the second color gamut by a user interface, and correcting the above color to colors on a surface or inside of the second color gamut.

(Supplementary Note 17)

The program described in any one of the supplementary notes 13 to 16, further including a fourth color correction procedure for changing a parameter of the color selected by the user interface from colors constituting the first color gamut that constitute the color conversion information.

(Supplementary Note 18)

The program described in the supplementary note 17, wherein the fourth color correction procedure is a procedure for selecting a color to be corrected from colors of an evaluation image proposed on an image apparatus having the second color gamut.

(Supplementary Note 20)

A color reproduction method including:

inputting a first color gamut on an input side and a second color gamut on an output side;

generating a first color correction in which color adaptation is taken into consideration on the basis of reference white in the first color gamut and the second color gamut and a second color correction for converting a basic color in the first color gamut into a basic color in the second color gamut;

applying the first color correction and the second color correction to the first color gamut to generate a correction color gamut, and generating the third color correction for performing the color correction to colors constituting the correction color gamut that are present outside of the second color gamut; and generating conversion information for converting the first color gamut into the second color gamut.

(Supplementary Note 21)

A color reproduction method including:

inputting a first color gamut on an input side and a second color gamut on an output side in which a correspondence relationship between color device values and tristimulus values is known;

generating a first color correction for converting a basic color in the first color gamut into a desired color in the second color gamut;

generating a second color correction for correcting the colors except the basic colors in the first color gamut;

applying the first color correction and the second color correction to the first color gamut and generating a correction color gamut;

applying a third color correction along with a user interface for performing a color correction in a uniform color space to an arbitrary color in the correction color gamut, and generating color conversion information about a color in the second color gamut corresponding to an arbitrary color in the first color gamut.

(Supplementary Note 22)

The color reproduction method described in the supplementary note 20 or 21, wherein in the first color correction, the same basic color in the first color gamut or colors, color device values of which are matched with each other are selected as the desired color in the second color gamut.

(Supplementary Note 23)

The color reproduction method described in any one of the supplementary notes 20 to 22, wherein in the second color correction, color correction information about a color to be corrected is generated on the basis of the color correction information obtained by the first color correction with respect to two basic colors interleaving the color to be corrected.

(Supplementary Note 24)

The color reproduction method described in any one of the supplementary notes 20 to 23, wherein in the user interface of the third color correction, an evaluation image is proposed to the user on a color image apparatus having the second color gamut, and the user can confirm advantageous effects of the first color correction, the second color correction, and the third color correction by the evaluation image.

(Supplementary Note 25)

The color reproduction method described in the supplementary note 24, wherein in the user interface of the third color correction, a color to be corrected by the third color correction is selected from colors of the evaluation image proposed on a color image apparatus having the second color gamut.

This application is based upon and claims the benefit of priority of the prior Japanese Patent Application No. 2012-052107, filed on Mar. 8, 2012, the entire contents of which are incorporated herein by reference.

INDUSTRIAL APPLICABILITY

The present invention is applicable to the color reproduction system, the color reproduction program, and the color reproduction apparatus between the color image reproduction systems or the color image apparatus that are different in the color gamut. Further, the present invention is applicable also to a function of creating a color conversion table between the color image reproduction systems or the color image apparatus that are different in the color gamut.

REFERENCE SIGNS LIST

1 Color gamut input means
2 Color gamut display means
3 First color correction means
4 Second color correction means
5 Third color correction means
6 Color gamut correction interface means
7 Fourth color correction means
8 Color correction interface means
9 Evaluation image display means
10 Color gamut storage memory
100 Color reproduction system
200 Color reproduction system
300 Color reproduction system
400 Color reproduction apparatus

The invention claimed is:

1. A color reproduction method comprising executing on a computer:

reading a first color gamut on an input side and a second color gamut on an output side from a memory storing the first color gamut and the second color gamut;

applying, to the first color gamut, a first color correction in which color adaptation is taken into consideration on a basis of reference white in the first color gamut and the second color gamut and a second color correction for matching basic colors in the first color gamut and the second color gamut with each other, wherein said second color correction is a color correction in which, as a saturation of a point X to which the second color correction is applied becomes higher, correction intensity for a lightness, the saturation, and a hue applied to the point X is calculated to be more intensified, wherein the saturation, the hue, and the lightness are three attributes of color, and the second color correction is applied to colors except basic colors;

applying, to a first color gamut to which the first color correction and the second color correction are applied, a third color correction for correcting a color that is present in colors outside of the second color gamut to colors on a surface or inside of the second color gamut;

generating color conversion information for converting the first color gamut into the second color gamut; and outputting said color conversion information for converting the first color gamut into the second color gamut.

2. The color reproduction method according to claim 1, wherein in the second color correction, with respect to the colors except the basic colors, that are present in a color space extending between a first basic color and a second basic color of the basic colors, a color correction is performed on a basis of color correction information about said first basic color and said second basic color.

3. The color reproduction method according to claim 1, wherein in the third color correction, the second color gamut and a color gamut in which the first color correction and the second color correction are applied to the first color gamut are displayed on a color space, and a color that is present in the colors outside of the second color gamut is selected by a user interface, and is corrected to colors on a surface or inside of the second color gamut.

4. The color reproduction method according to claim 1, wherein from colors constituting the first color gamut that constitute the color conversion information, a fourth color correction for changing a parameter of the color selected by the user interface is performed.

5. The color reproduction method according to claim 4, wherein in the fourth color correction, a color to be corrected is selected from colors of an evaluation image proposed on an image apparatus having the second color gamut.

6. A color reproduction system comprising:
a computer configured to:
read a first color gamut on an input side and a second color gamut on an output side from a memory storing the first color gamut and the second color gamut;
perform a first color correction in which color adaptation is taken into consideration on a basis of reference white in the first color gamut and the second color gamut;
perform a second color correction for matching basic colors in the first color gamut and the second color gamut with each other, wherein said second color correction is a color correction in which, as a saturation of a point X to which the second color correction is applied becomes higher, correction intensity for a lightness, the saturation, and a hue applied to the point X is calculated to be more intensified, wherein
the saturation, the hue, and the lightness are three attributes of color, and
the second color correction is applied to colors except basic colors;
perform a third color correction for correcting a color that is present in colors outside of the second color gamut to colors on a surface or inside of the second color gamut with respect to the first color gamut to which the first color correction and the second color correction are applied, wherein color conversion information for converting the first color gamut into the second color gamut is generated; and
output said color conversion information for converting the first color gamut into the second color gamut.

7. The color reproduction system according to claim 6, wherein with respect to the colors except the basic colors, that are present in a color space extending between a first basic color and a second basic color of the basic colors, the computer is configured to perform a color correction on a basis of color correction information about said first basic color and said second basic color.

8. A non-transitory computer readable storage medium storing a program for causing a computer to execute:
a procedure for reading a first color gamut on an input side and a second color gamut on an output side from a memory storing the first color gamut and the second color gamut;
a first color correction procedure for performing a first color correction in which color adaptation is taken into consideration on a basis of reference white in the first color gamut and the second color gamut;
a second color correction procedure for performing a second color correction for matching basic colors in the first color gamut and the second color gamut with each other, wherein said second color correction is a color correction in which, as a saturation of a point X to which the second color correction is applied becomes higher, correction intensity for a lightness, the saturation, and a hue applied to the point X is calculated to be more intensified, wherein
the saturation, the hue, and the lightness are three attributes of color, and
the second color correction is applied to colors except basic colors;
a third color correction procedure for performing a third color correction for correcting a color that is present in colors outside of the second color gamut to colors on a surface or inside of the second color gamut with respect to the first color gamut to which the first color correction and the second color correction are applied, wherein color conversion information for converting the first color gamut into the second color gamut is generated; and
a procedure for outputting said color conversion information for converting the first color gamut into the second color gamut.

9. The color reproduction system according to claim 6, wherein the computer is configured to display, on a color space, the second color gamut and a color gamut in which the first color correction and the second color correction are applied to the first color gamut, selects a color that is present in the colors outside of the second color gamut by a user interface, and corrects the above color to colors on a surface or inside of the second color gamut.

10. The color reproduction system according to claim 6, wherein the computer is configured to change a parameter of the color selected by the user interface from colors constituting the first color gamut that constitute the color conversion information.

11. The color reproduction system according to claim 10, wherein the computer is configured to select a color to be corrected from colors of an evaluation image proposed on an image apparatus having the second color gamut.

12. The non-transitory computer readable storage medium storing a program according to claim 8, wherein with respect to the colors except the basic colors, that are present in a color space extending between a first basic color and a second basic color of the basic colors, the second color correction procedure is a procedure for performing a color correction on the basis of color correction information about said first basic color and second basic color.

13. The non-transitory computer readable storage medium storing a program according to claim 8, wherein the third color correction procedure is a procedure for displaying, on a color space, the second color gamut and a color gamut in which the first color correction and the second color correction are applied to the first color gamut, selecting a color that is present in the colors outside of the second color gamut by a user interface, and correcting the above color to colors on a surface or inside of the second color gamut.

14. The non-transitory computer readable storage medium storing a program according to claim 8, further including a fourth color correction procedure for changing a parameter of the color selected by the user interface from colors constituting the first color gamut that constitute the color conversion information.

15. The non-transitory computer readable storage medium storing a program according to claim 14, wherein the fourth color correction procedure is a procedure for selecting a color to be corrected from colors of an evaluation image proposed on an image apparatus having the second color gamut.

16. The color reproduction method according to claim 1, wherein said saturation component indicates chroma.

17. The color reproduction system according to claim 6, wherein said saturation component indicates chroma.

18. The non-transitory computer readable storage medium storing a program according to claim 8, wherein said saturation.

* * * * *